United States Patent
Hamada et al.

(10) Patent No.: US 9,874,360 B2
(45) Date of Patent: Jan. 23, 2018

(54) AIR-CONDITIONING SYSTEM

(71) Applicant: Mitsubishi Electric Corporation, Tokyo (JP)

(72) Inventors: Mamoru Hamada, Tokyo (JP); Fumitake Unezaki, Tokyo (JP); Naomichi Tamura, Tokyo (JP); Kazunobu Nishimiya, Tokyo (JP); Hidemoto Arai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 14/888,715

(22) PCT Filed: May 14, 2013

(86) PCT No.: PCT/JP2013/063466
§ 371 (c)(1),
(2) Date: Nov. 3, 2015

(87) PCT Pub. No.: WO2014/184883
PCT Pub. Date: Nov. 20, 2014

(65) Prior Publication Data
US 2016/0084511 A1    Mar. 24, 2016

(51) Int. Cl.
*F24F 3/06* (2006.01)
*F24F 3/14* (2006.01)
(Continued)

(52) U.S. Cl.
CPC .............. *F24F 3/06* (2013.01); *F24F 1/0003* (2013.01); *F24F 3/065* (2013.01); *F24F 3/14* (2013.01);
(Continued)

(58) Field of Classification Search
CPC ...... F24F 3/06; F24F 3/065; F24F 3/14; F24F 11/0001; F24F 11/0008; F24F 12/06;
(Continued)

(56) References Cited

U.S. PATENT DOCUMENTS

| 5,257,736 A | * | 11/1993 | Roy | F24F 7/08 165/232 |
| 2008/0003940 A1 | * | 1/2008 | Haglid | F24F 3/14 454/228 |

(Continued)

FOREIGN PATENT DOCUMENTS

| JP | 2005-049059 A | 2/2005 |
| JP | 2005-291585 A | 10/2005 |

(Continued)

OTHER PUBLICATIONS

International Search Report of the International Searching Authority dated Aug. 20, 2013 for the corresponding international application No. PCT/JP2013/063466 (and English translation).

*Primary Examiner* — Marc Norman
(74) *Attorney, Agent, or Firm* — Posz Law Group, PLC

(57) ABSTRACT

Maximum evaporating temperature setting values and minimum evaporating temperature setting values in an indoor heat exchanger and a ventilator cooler are determined in accordance with outdoor air temperature and humidity, evaporating temperature setting values in the indoor heat exchanger and the ventilator cooler are set to be between the respective maximum evaporating temperature setting values and the respective minimum evaporating temperature setting values, and evaporating temperatures in the indoor heat exchanger and the ventilator cooler are controlled so as to be the respective evaporating temperature setting values.

12 Claims, 8 Drawing Sheets

(51) Int. Cl.
*F24F 12/00* (2006.01)
*F24F 11/00* (2006.01)
*F24F 1/00* (2011.01)

(52) U.S. Cl.
CPC ...... *F24F 11/0001* (2013.01); *F24F 11/0008* (2013.01); *F24F 12/006* (2013.01); *F24F 2001/0051* (2013.01); *Y02B 30/563* (2013.01)

(58) Field of Classification Search
CPC .......... F24F 2001/0051; F25B 2700/02; F25B 2700/2106; F25B 2700/2117; Y02B 30/563
See application file for complete search history.

(56) References Cited

U.S. PATENT DOCUMENTS

2014/0157806 A1* 6/2014 Ito .......................... F24F 3/1411
 62/92
2015/0362200 A1* 12/2015 Hamada ................. F25B 13/00
 62/175

FOREIGN PATENT DOCUMENTS

| JP | 2010-065977 A | 3/2010 |
|----|---------------|--------|
| JP | 2010-071587 A | 4/2010 |
| JP | 2010-107152 A | 5/2010 |
| JP | 2010-249485 A | 11/2010 |
| JP | 2013-072590 A | 4/2013 |

\* cited by examiner

| | INDOOR HEAT EXCHANGER | | VENTILATOR COOLER | |
|---|---|---|---|---|
| EVAPORATING TEMPERATURE LEVEL | MAXIMUM EVAPORATING TEMPERATURE ET_max | MINIMUM EVAPORATING TEMPERATURE ET_min | MAXIMUM EVAPORATING TEMPERATURE ET_max | MINIMUM EVAPORATING TEMPERATURE ET_min |
| Hi LEVEL | ETi_hi_max | ETi_hi_min | ETv_hi_max | ETv_hi_min |
| Lo LEVEL | ETi_lo_max | ETi_lo_min | ETv_lo_max | ETv_lo_min |

AIR-CONDITIONING SYSTEM

CROSS REFERENCE TO RELATED APPLICATION

This application is a U.S. national stage application of International Application No. PCT/JP2013/063466 filed on May 14, 2013, the disclosure of which is incorporated herein by reference.

TECHNICAL FIELD

The present invention relates to an air-conditioning system including an air-conditioning apparatus and a ventilator.

BACKGROUND ART

In an existing air-conditioning system including an air-conditioning apparatus and a ventilator, the ventilator performs the operation of replacing room air with outdoor fresh air, and a load is a cooling load (outdoor air load) in the case where an enthalpy of air introduced from outdoor air is high during cooling. Furthermore, as other heat loads, there are an indoor load generated in a room, and a frame load that enters through walls or the like of a building.

In order to handle a latent heat load of these heat loads, an evaporating temperature of refrigerant in an indoor heat exchanger of the air-conditioning apparatus is kept constant at a low temperature, and thus the latent heat load is handled.

However, there is a problem in that the operation in which the latent heat load is handled such that the evaporating temperature remains constant at a low temperature reduces operating efficiency. On the other hand, there is a problem in that an increase in the evaporating temperature enhances the operating efficiency, but results in an insufficient amount of handled latent heat, thereby increasing room air humidity and reducing comfort.

Thus, a latent heat-sensible heat separation-based air-conditioning system is provided (for example, Patent Literature 1). In the latent heat-sensible heat separation-based air-conditioning system, a ventilator that performs an outdoor air process and an air-conditioning apparatus are each independently controlled, an evaporating temperature in an indoor heat exchanger of the air-conditioning apparatus is controlled to be not less than a dew point temperature of room air so that a sensible heat load is mainly handled, and also, an evaporating temperature to secure an amount of dehumidification required for the ventilator that performs the outdoor air process is set so that a latent heat load is mainly handled.

CITATION LIST

Patent Literature

Patent Literature 1: Japanese Unexamined Patent Application Publication No. 2010-065977

SUMMARY OF INVENTION

Technical Problem

In an existing air-conditioning system like that described above including an air-conditioning apparatus and a ventilator, the air-conditioning apparatus and the ventilator control respective refrigeration cycles, adjust evaporating temperatures in respective evaporators, and thus respectively handle a sensible heat load and a latent heat load separately; however, an uniform setting method is used in which an evaporating temperature in the ventilator is obtained from an amount of dehumidification required and is set, and in which an evaporating temperature in an indoor heat exchanger of the air-conditioning apparatus is set to be not less than a dew point temperature.

For this reason, there is a problem in that appropriate evaporating temperatures cannot be set in consideration of outdoor air temperature and humidity conditions, room air temperature and humidity conditions, and so forth for the respective evaporators of the air-conditioning apparatus and the ventilator.

The present invention has been accomplished in order to solve the existing problem in a method of setting an appropriate evaporating temperature in an evaporator, and an object thereof is to provide an air-conditioning system that avoids a reduction in comfort due to an insufficient amount of handled latent heat (insufficient dehumidification) and a reduction in energy savings due to excessive latent heat processing in consideration of an outdoor air load, and implements an increase in energy savings while comfort is maintained (temperature and humidity are maintained).

Solution to Problem

An air-conditioning system according to the present invention includes a refrigerant system including an outdoor unit, an indoor unit, and a ventilator through which refrigerant circulates. The refrigerant system includes a compressor, an outdoor heat exchanger, a first expansion valve, an indoor heat exchanger, a second expansion valve, and a ventilator cooler. The indoor unit includes the first expansion valve and the indoor heat exchanger, and is configured to circulate room air while adjusting a temperature of the room air. The ventilator includes the second expansion valve and the ventilator cooler, and is configured to replace room air with outdoor air, and also to cool and dehumidify the outdoor air with the ventilator cooler. The outdoor unit, the indoor unit, and the ventilator are connected with a refrigerant pipe. The air-conditioning system includes a unit configured to detect temperature and humidity of outdoor air. Maximum evaporating temperature setting values and minimum evaporating temperature setting values in the indoor heat exchanger and the ventilator cooler are determined in accordance with outdoor air temperature and humidity, evaporating temperature setting values in the indoor heat exchanger and the ventilator cooler are set to be between the respective maximum evaporating temperature setting values and the respective minimum evaporating temperature setting values, and evaporating temperatures in the indoor heat exchanger and the ventilator cooler are controlled so as to be the respective evaporating temperature setting values.

Advantageous Effects of Invention

According to the present invention, since the evaporating temperature setting values in the indoor heat exchanger and the ventilator cooler are set to fall within respective ranges of from the respective maximum evaporating temperature setting values to the respective minimum evaporating temperature setting values which are changed on the basis of outdoor air temperature and humidity conditions, a sensible heat load and a latent heat load are assumed from the outdoor air temperature and humidity conditions, thereby enabling setting of the evaporating temperature setting values with a certain control range. This facilitates following changes in load, also implements latent heat processing and sensible heat processing at appropriate evaporating temperatures, and can secure energy savings while comfort is maintained.

DESCRIPTION OF EMBODIMENTS

Embodiment 1

Figure 1:
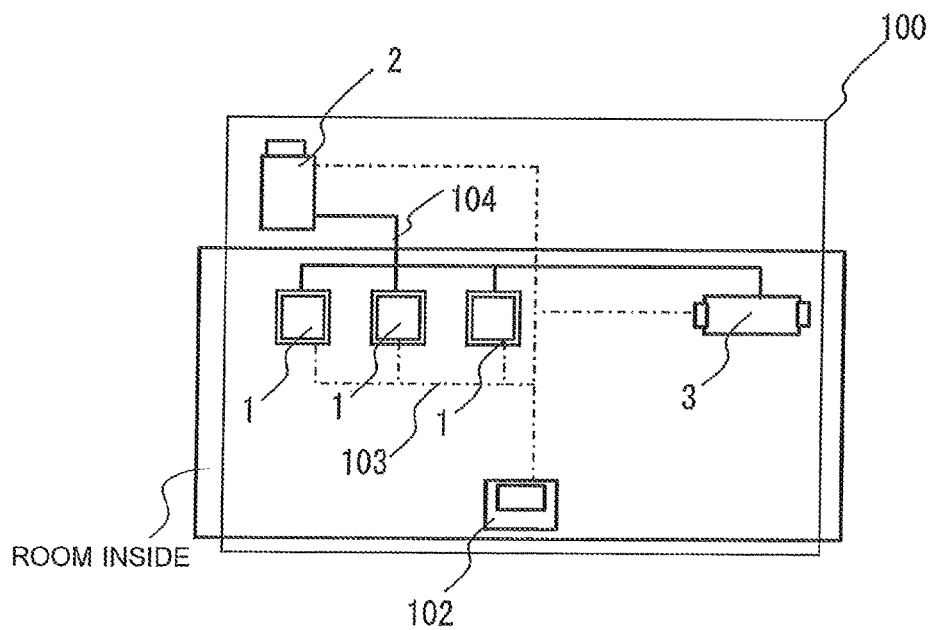
FIG. 1 is a schematic view of an air-conditioning system in the present invention.

FIG. 1 is a schematic view of an air-conditioning system in Embodiment 1. In an air-conditioning system 100, one or a plurality of indoor units 1 and one or a plurality of ventilators 3 are connected to an outdoor unit 2 with a refrigerant pipe 104. The indoor units 1, the outdoor unit 2, and the ventilator 3 are also connected to a central controller 102 with a transmission line 103. A target temperature-humidity setting unit 44, which is not illustrated, is provided in the central controller 102.

Figure 2:
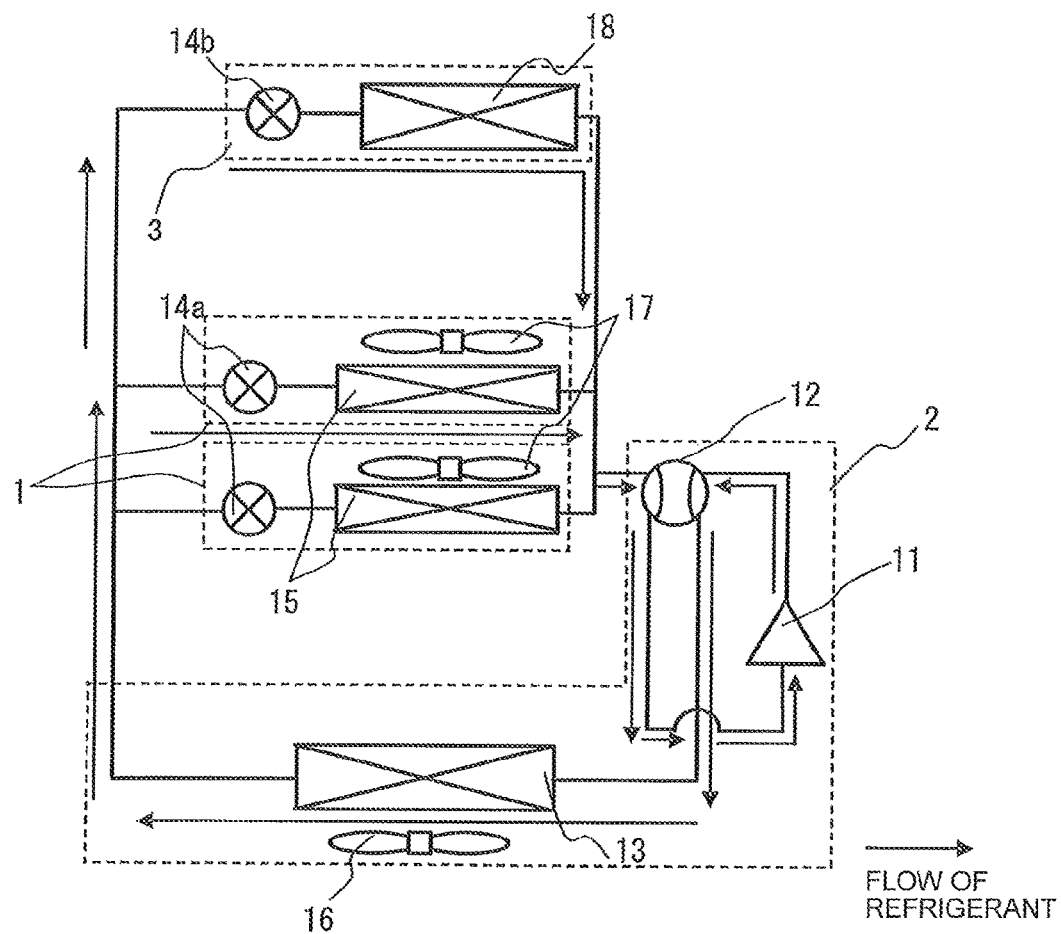
FIG. 2 is a refrigerant circuit diagram during cooling operation in the present invention.

FIG. 2 is a refrigerant circuit diagram of the air-conditioning system in Embodiment 1. A refrigerant system circuit includes a compressor 11, a four-way valve 12, an outdoor heat exchanger 13, a first expansion valve 14a, an indoor heat exchanger 15, a second expansion valve 14b, and a ventilator cooler 18. There are installed one or a plurality of indoor units 1 including the first expansion valve 14a, the indoor heat exchanger 15, and an indoor heat exchanger fan 17. There are installed one or a plurality of ventilators 3 including the second expansion valve 14b and the ventilator cooler 18.

Figure 3:
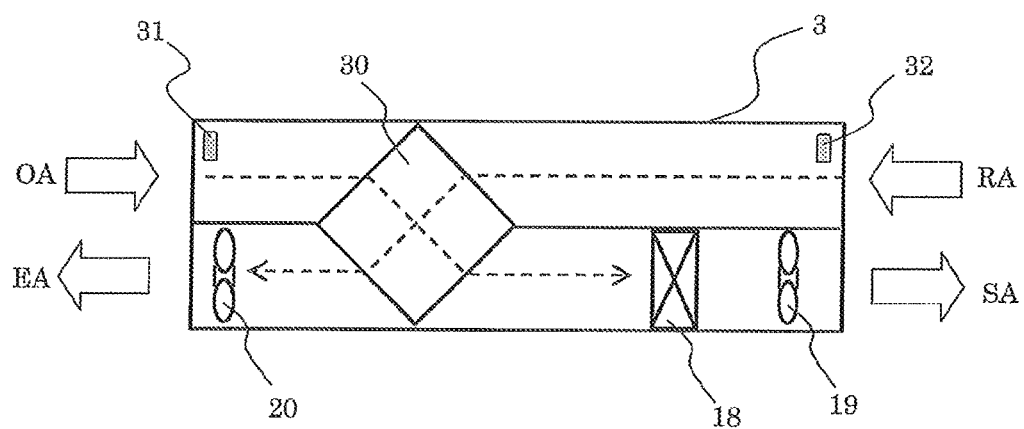
FIG. 3 is a schematic configuration diagram of a ventilator in the present invention.

FIG. 3 is a schematic configuration diagram of the ventilator 3 of the air-conditioning system in Embodiment 1. As illustrated in FIG. 3, the ventilator 3 includes the ventilator cooler 18, an air supply fan 19, an air exhaust fan 20, a total heat exchanger 30 that performs the total heat exchange between room air (RA) and outdoor air (OA), an OA temperature-humidity detection unit 31 that detects the temperature and humidity of the outdoor air (OA), and an RA temperature-humidity detection unit 32 that detects the temperature and humidity of the room air (RA). The outdoor air (OA) having been subjected to the total heat exchange is supplied to a room as supply air (SA), and the room air (RA) having been subjected to the total heat exchange is exhausted to the outside as exhaust air (EA).

Figure 4:
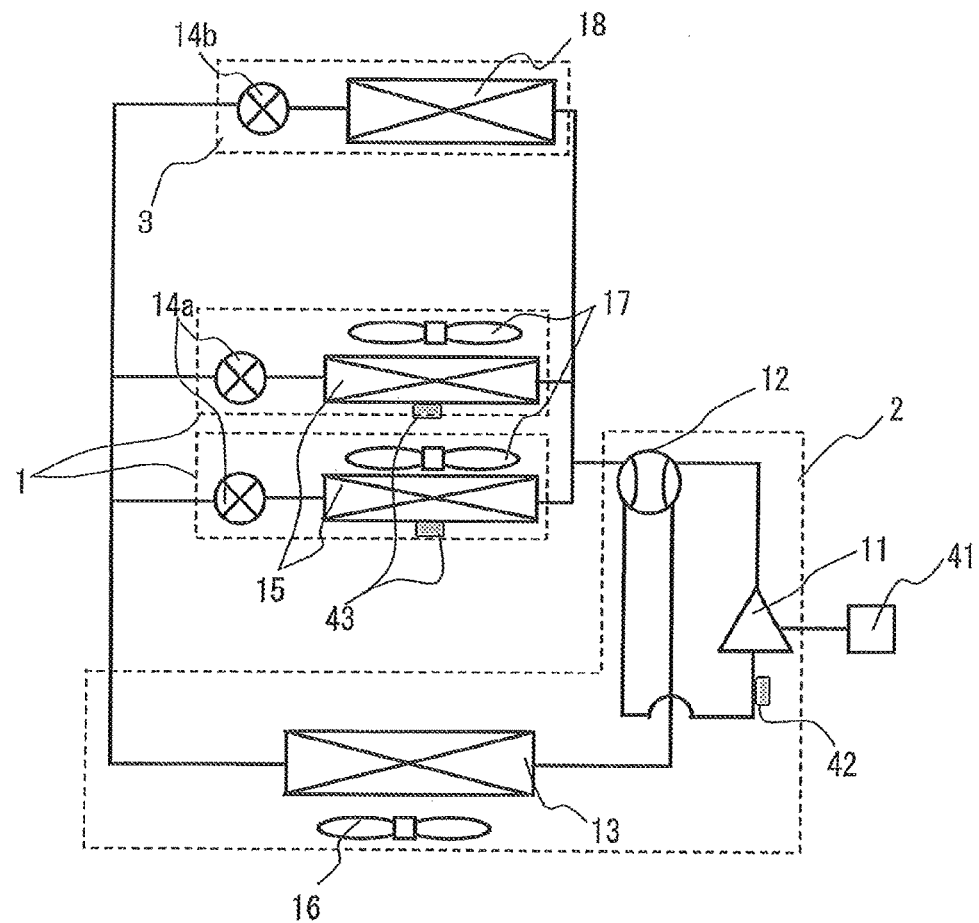
FIG. 4 is a refrigerant circuit diagram in the present invention.

FIG. 4 is a refrigerant circuit diagram of the air-conditioning system in Embodiment 1. As illustrated in FIG. 4, a compressor frequency adjustment unit 41 and an evaporating temperature detection unit 42 are provided, and an intake temperature-humidity detection unit 43 is provided in each indoor unit 1.

Figures 5, 6:
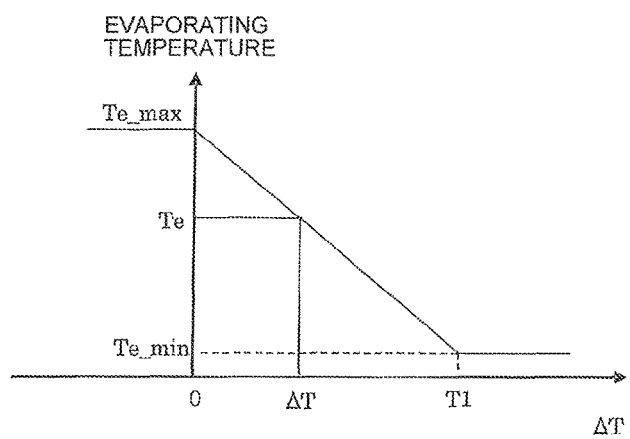
FIG. 5 illustrates an evaporating temperature setting value Te in the present invention.
FIG. 6 illustrates setting ranges of evaporating temperature setting values Te in the present invention.

Next, evaporating temperature control in an evaporator in Embodiment 1 will be described. FIG. 5 illustrates an evaporating temperature setting value Te in the indoor heat exchanger 15 or the ventilator cooler 18 of the ventilator 3 in Embodiment 1. The vertical axis represents the evaporating temperature setting value Te in the indoor heat exchanger 15 or the ventilator cooler 18 of the ventilator 3, and the horizontal axis represents ΔT which is a temperature difference obtained by subtracting a room air target temperature Ta_tgt set with the target temperature-humidity setting unit 44 from a room air temperature Ta detected with the intake temperature-humidity detection unit 43. Te_max denotes a maximum evaporating temperature which is a maximum value of the evaporating temperature setting value Te, and Te_min denotes a minimum evaporating temperature which is a minimum value of the evaporating temperature setting value Te.

An evaporating temperature in the indoor heat exchanger 15 or the ventilator cooler 18 is adjusted so as to be the evaporating temperature setting value Te which is determined to be between the maximum evaporating temperature Te_max and the minimum evaporating temperature Te_min in accordance with ΔT which is a temperature difference obtained by subtracting the room air target temperature Ta_tgt from the room air temperature Ta, by changing operating frequency of the compressor 11 with the compressor frequency adjustment unit 41 and adjusting an opening degree of the expansion valve 14.

FIG. 6 illustrates setting ranges of evaporating temperature setting values Te in an indoor unit 1 system and a ventilator 3 system in Embodiment 1. As illustrated in FIG. 6, in each of the indoor heat exchanger 15 of the indoor unit 1 system and the ventilator cooler 18 of the ventilator 3 system, the maximum evaporating temperature Te_max is denoted by ET_max, and the minimum evaporating temperature Te_min is denoted by ET_min. In each of the indoor heat exchanger 15 and the ventilator cooler 18, the maximum evaporating temperature Te_max and the minimum evaporating temperature Te_min each include two types of values: a Hi level at which the evaporating temperature is high and a Lo level at which the evaporating temperature is low.

In the indoor heat exchanger 15, in the case of the Hi level at which the evaporating temperature is high, a maximum evaporating temperature is denoted by ETi_hi_max, and a minimum evaporating temperature is denoted by ETi_hi_min, and in the case of the Lo level at which the evaporating temperature is low, a maximum evaporating temperature is denoted by ETi_lo_max, and a minimum evaporating temperature is denoted by ETi_lo_min. Similarly, in the ventilator cooler 18, in the case of the Hi level at which the evaporating temperature is high, a maximum evaporating temperature is denoted by ETv_hi_max, and a minimum evaporating temperature is denoted by ETv_hi_min, and in the case of the Lo level at which the evaporating temperature is low, a maximum evaporating temperature is denoted by ETv_lo_max, and a minimum evaporating temperature is denoted by ETv_lo_min.

In the indoor heat exchanger 15 and the ventilator cooler 18, in each of Hi level setting and Lo level setting, values of the maximum evaporating temperatures ET_max may be the same value or be different values, and values of the minimum evaporating temperatures ET_min may be the same value or be different values.

Examples of the same value include ETi_hi_max=ETv_hi_max=14 degrees C., ETi_hi_min=ETv_hi_min=9 degrees C., ETi_lo_max=ETv_lo_max=9 degrees C., and ETi_lo_min=ETv_lo_min=0 degrees C.

Examples of the different values include ETi_hi_max=14 degrees C., ETv_hi_max=12 degrees C., ETi_hi_min=9 degrees C., ETv_hi_min=7 degrees C., ETi_lo_max=9 degrees C., ETv_lo_max=7 degrees C., ETi_lo_min=2 degrees C., and ETv_lo_min=0 degrees C.

In this case, the values of the maximum evaporating temperatures ET_max and the values of the minimum evaporating temperatures ET_min in the indoor heat exchanger 15 and the ventilator cooler 18 are each set to an optimum value, thereby enabling a sensible heat load and a latent heat load to be handled more appropriately.

Switching between the Hi level and the Lo level of an evaporating temperature is determined in accordance with outdoor air temperature and humidity conditions so that the indoor unit 1 system mainly performs sensible heat processing and the ventilator 3 system performs sensible heat processing+latent heat processing. As the outdoor air temperature and humidity, detection values of the OA temperature-humidity detection unit 31 of the ventilator 3 are used.

Figure 7:
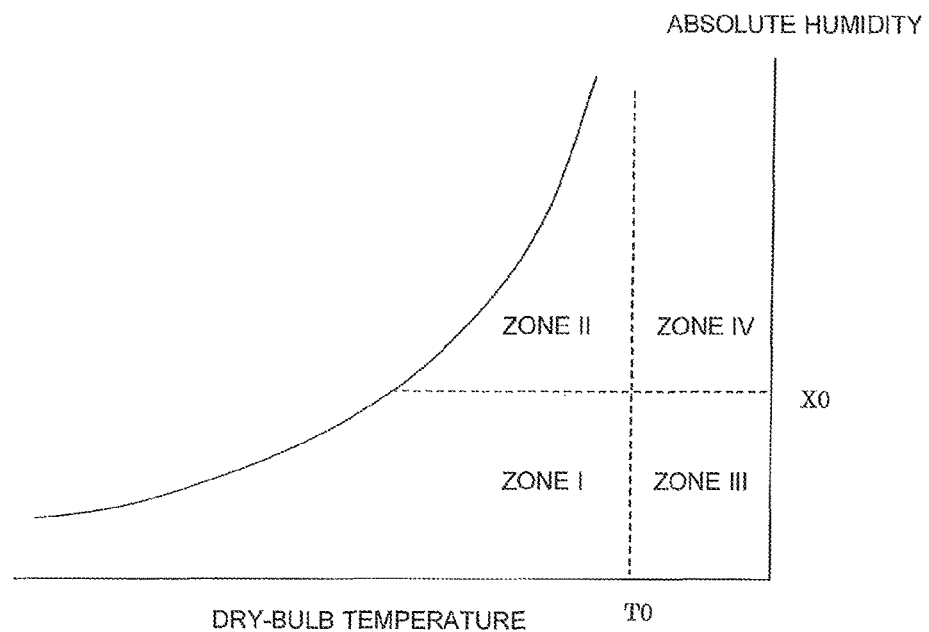
FIG. 7 is a psychrometric chart illustrating assignments to zones in the present invention.

FIG. 7 is a psychrometric chart on which conditions of outdoor air sucked by the ventilator 3 are assigned to four zones with respect to a dry-bulb temperature T0 and absolute humidity X0 serving as boundaries.

If detection values of the OA temperature-humidity detection unit 31 of the ventilator 3 are in a zone I, outdoor air is of low temperature/low humidity, and thus the detection values are low sensible heat/low latent heat load conditions.

If detection values are in a zone II, outdoor air is of low temperature/high humidity, and thus the detection values are low sensible heat/high latent heat load conditions.

If detection values are in a zone III, outdoor air is of high temperature/low humidity, and thus the detection values are high sensible heat/low latent heat load conditions.

If detection values are in a zone IV, outdoor air is of high temperature/high humidity, and thus the detection values are high sensible heat/high latent heat load conditions.

In the low sensible heat/low latent heat load conditions (zone I), even if the evaporating temperature in the indoor heat exchanger 15 which mainly handles sensible heat is increased, insufficient cooling does not occur because of a low sensible heat load, and, even if the evaporating temperature in the ventilator cooler 18 which performs latent heat processing is increased, insufficient dehumidification does not occur because of a low latent heat load.

Thus, an evaporating temperature level in FIG. 6 can be set to the Hi level, the evaporating temperature setting value Te in the indoor unit system is between ET_max=ETi_hi_max and ET_min=ETi_hi_min, and the evaporating temperature setting value Te is determined as illustrated in FIG. 5 in accordance with ΔT which is a temperature difference obtained by subtracting the room air target temperature Ta_tgt from the room air temperature Ta.

Also, the evaporating temperature setting value Te in the ventilator cooler 18 is between ET_max=ETv_hi_max and ET_min=ETv_hi_min, and the evaporating temperature setting value Te is determined as illustrated in FIG. 5 in accordance with ΔT which is a temperature difference between the room air temperature Ta and the room air target temperature Ta_tgt.

In the low sensible heat/high latent heat load conditions (zone II), even if the evaporating temperature in the indoor heat exchanger 15 which mainly handles sensible heat is increased, insufficient cooling does not occur because of a low sensible heat load; however, if the evaporating temperature in the ventilator cooler 18 which performs latent heat processing is increased, insufficient dehumidification occurs because of a high latent heat load. That is to say, the evaporating temperature level in FIG. 6 has to be set to the Lo level.

In the high sensible heat/low latent heat load conditions (zone III), even if the evaporating temperature in the ventilator cooler 18 which handles a latent heat load is increased, insufficient dehumidification does not occur because of a low latent heat load; however, if the evaporating temperature in the indoor heat exchanger 15 which mainly handles sensible heat is increased, insufficient cooling occurs because of a high sensible heat load. That is to say, the evaporating temperature level in FIG. 6 has to be set to the Lo level.

In the high sensible heat/high latent heat load conditions (zone IV), if the evaporating temperature in the indoor heat exchanger 15 is increased, insufficient cooling occurs because of a high sensible heat load, and, if the evaporating temperature in the ventilator cooler 18 which performs latent heat load processing is increased, insufficient dehumidification occurs because of a high latent heat load. That is to say, the evaporating temperature level in FIG. 6 has to be set to the Lo level.

Thus, in the zone II to the zone IV, the evaporating temperature setting value Te in the indoor heat exchanger 15 of the indoor unit system is between ET_max=ETi_lo_max and ET_min=ETi_lo_min, and the evaporating temperature setting value Te is determined as illustrated in FIG. 5 in accordance with ΔT which is a temperature difference obtained by subtracting the room air target temperature Ta_tgt (degrees C.) from the room air temperature Ta.

Also, the evaporating temperature setting value Te in the ventilator cooler 18 of the ventilator system is between ET_max=ETv_lo_max and ET_min=ETv_lo_min, and the evaporating temperature setting value Te is determined as illustrated in FIG. 5 in accordance with ΔT which is a temperature difference obtained by subtracting the room air target temperature Ta_tgt from the room air temperature Ta.

Then, Te is taken as Te=ET_max when ΔT is 0, Te is taken as Te=ET_min when ΔT is T1, a relationship between the evaporating temperature setting value Te and ΔT is taken as a proportional relationship in the range of from ET_max to ET_min when 0≤ΔT≤T1 is satisfied, and the evaporating temperature setting value Te is determined.

Figure 8:
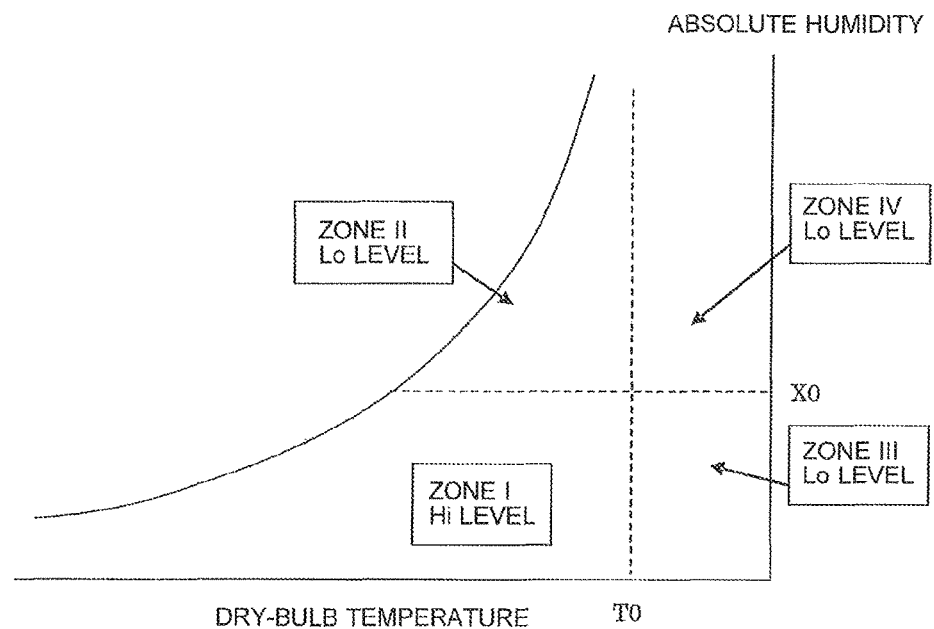
FIG. 8 is a psychrometric chart illustrating evaporating temperature levels in Embodiment 1 of the present invention.

Thus, the evaporating temperature levels Hi and Lo are assigned to the zones I to IV and determined in accordance with outdoor air conditions as illustrated in FIG. 8.

The dry-bulb temperature T0 and the absolute humidity X0 which are threshold values between the individual zones in FIG. 7 and FIG. 8 are determined as follows. When an operating evaporating temperature is taken as the minimum evaporating temperature ET_min of the Hi level, T0 and X0 are respectively taken as a maximum outdoor air temperature and maximum outdoor air absolute humidity at which a sensible heat load and a latent heat load can be handled. That is to say, if an outdoor air temperature is not more than T0 and outdoor air absolute humidity is not more than X0, T0 and X0 are taken as thresholds values of the outdoor air conditions under which the sensible heat load and the latent heat load can be handled and target room air temperature and humidity can be reached at the minimum evaporating temperature of the Hi level.

As for a sensible heat load and a latent heat load, it is noted that not only outdoor air conditions but also loads, such as a human body, office automation equipment, and lighting, have to be taken into consideration; however, because the loads, such as a human body, office automation equipment, and lighting, are assumed to some extent for each building and are less likely to be changed, T0 and X0 may be calculated by using values assumed for each building.

Figure 9:
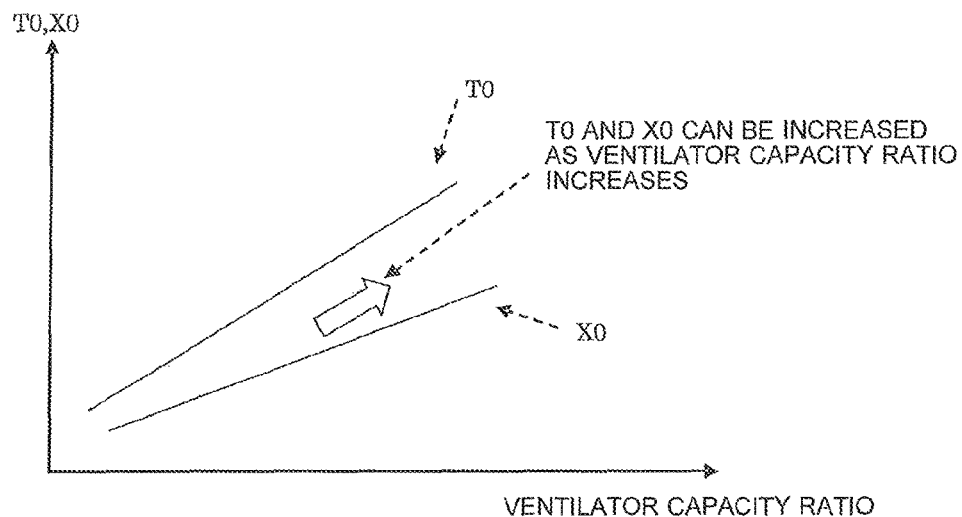
FIG. 9 illustrates a relationship between a ventilator capacity ratio, and threshold values T0 and X0 in the present invention.

Furthermore, T0 and X0 can be determined in accordance with a capacity ratio between the indoor heat exchanger 15 of the indoor unit 1 and the ventilator cooler 18 of the ventilator 3 which are connected. As illustrated in FIG. 9, because a higher capacity ratio of the ventilator cooler 18 to the indoor heat exchanger 15 exhibits a higher capacity to handle a sensible heat load and a latent heat load than a lower capacity ratio, T0 and X0 can be set to high values. Thus, T0 and X0 may be determined in accordance with the capacity ratio between the indoor heat exchanger 15 and the ventilator cooler 18.

For example, if the air volume of the ventilator 3 is increased, T0 and X0 are set to high values, thereby increasing an evaporating temperature range in which the evaporating temperature level is the Hi level, and enhancing energy-saving effects. On the contrary, for example, if the air volume of the ventilator 3 is reduced, T0 and X0 are set to low values, thereby enabling insufficient cooling and insufficient dehumidification to be avoided.

Figure 10:
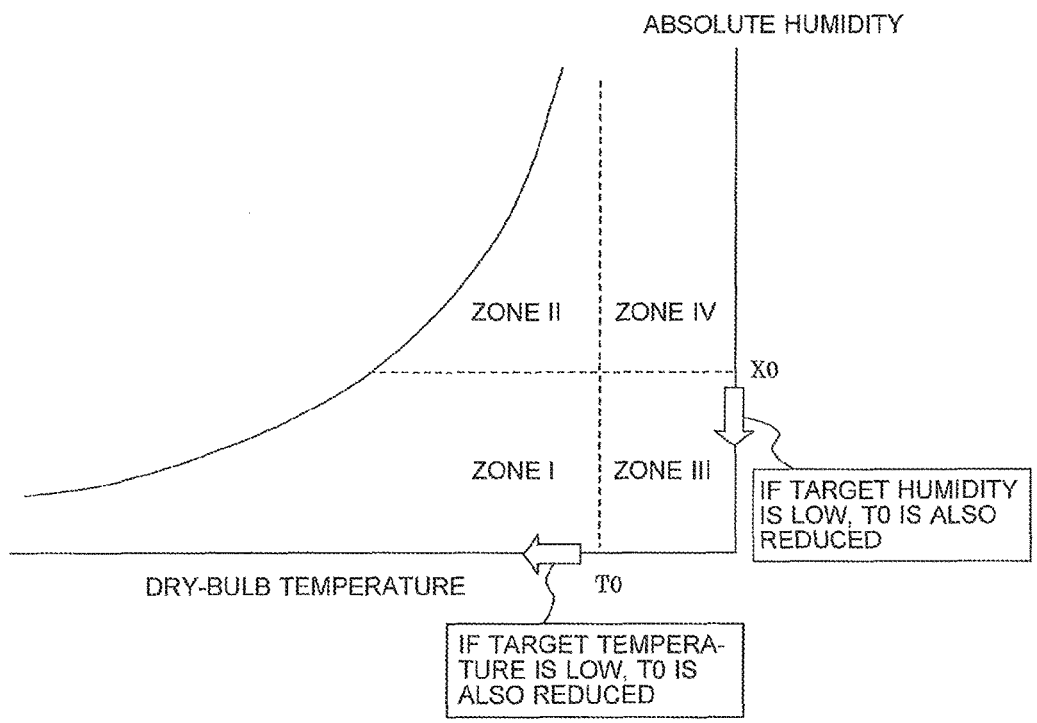
FIG. 10 is a psychrometric chart illustrating a relationship of the threshold values T0 and X0 with respect to a room air target temperature in the present invention.

Furthermore, the dry-bulb temperature T0 and the absolute humidity X0 which are threshold values between the individual zones may be changed in accordance with setting values of the target temperature-humidity setting unit 44 as illustrated in FIG. 10. When room air target temperature and humidity are changed, a sensible heat load and a latent heat load are changed even under the same outdoor air conditions, and T0 and X0 are thus changed. When the room air target temperature Ta_tgt is reduced, the sensible heat load is increased, and thus T0 is also reduced. When room air target absolute humidity Xa_tgt is reduced, the latent heat load is increased, and thus X0 is also reduced. This can avoid the occurrence of insufficient cooling and insufficient dehumidification even if the room air target temperature and humidity are changed.

Figure 11:
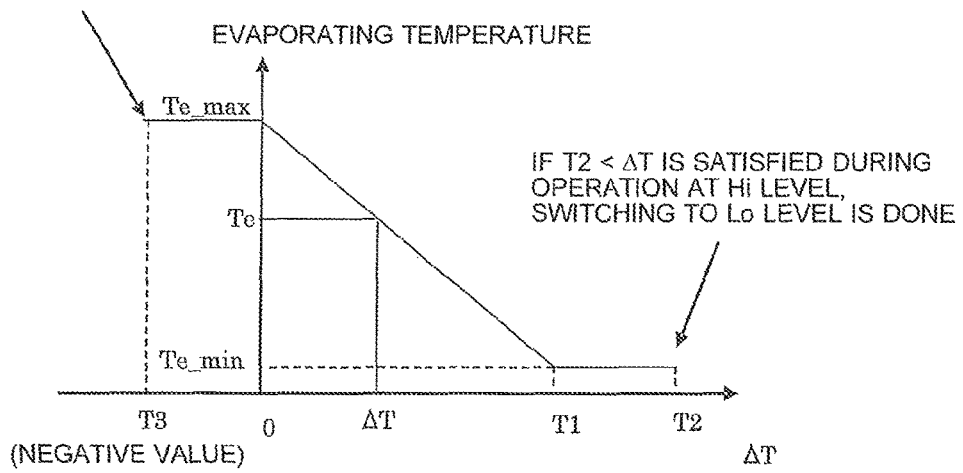
FIG. 11 illustrates a change in evaporating temperature level in the present invention.
Figure 12:
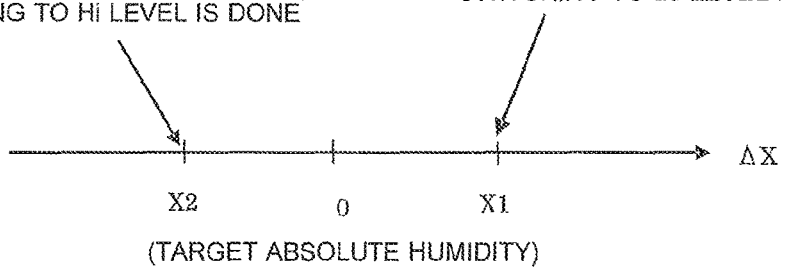
FIG. 12 illustrates a change in evaporating temperature level in the present invention.

At this time, control may be performed in which the evaporating temperature level is switched from the Hi level to the Lo level by using detection values of room air temperature and humidity. For example, while the indoor system is operating at the Hi level, if the difference ΔT obtained by subtracting the room air target temperature Ta_tgt set with the target temperature-humidity setting unit 44 from the room air temperature Ta detected with the intake temperature-humidity detection unit 43 is larger than T2 (T1<T2) as illustrated in FIG. 11, or if a difference ΔX obtained by subtracting the room air target absolute humidity Xa_tgt set with the target temperature-humidity setting unit 44 from room air absolute humidity Xa detected with the intake temperature-humidity detection unit 43 is larger than a predetermined value X1 (0<X1) as illustrated in FIG. 12, it is determined that a sensible heat load or a latent heat load cannot be handled, and the evaporating temperature level is switched to the Lo level. Feedback control is performed with the room air temperature and humidity detected in this way, thereby enabling insufficient cooling and insufficient dehumidification to be avoided.

On the contrary, during operation at the evaporating temperature level of the Lo level, if the difference ΔT obtained by subtracting the room air target temperature Ta_tgt from the room air temperature Ta is smaller than T3 (a negative value) as illustrated in FIG. 11, and if the difference ΔX obtained by subtracting the room air target temperature Ta_tgt from the room air temperature Ta is smaller than a predetermined value X2 (0>X2) as illustrated in FIG. 12, it is determined that a high evaporating temperature can be set because a sensible heat load and a latent heat load are excessively handled, and the evaporating temperature level is switched from the Lo level to the Hi level. Switching to the Hi level may be done if the compressor is thermostatically turned off during Lo level operation.

Furthermore, in the case where the room air temperature Ta and the room air absolute humidity Xa are detected, detection values of the RA temperature-humidity detection unit 32 provided in the ventilator 3 may be used.

Figure 13:
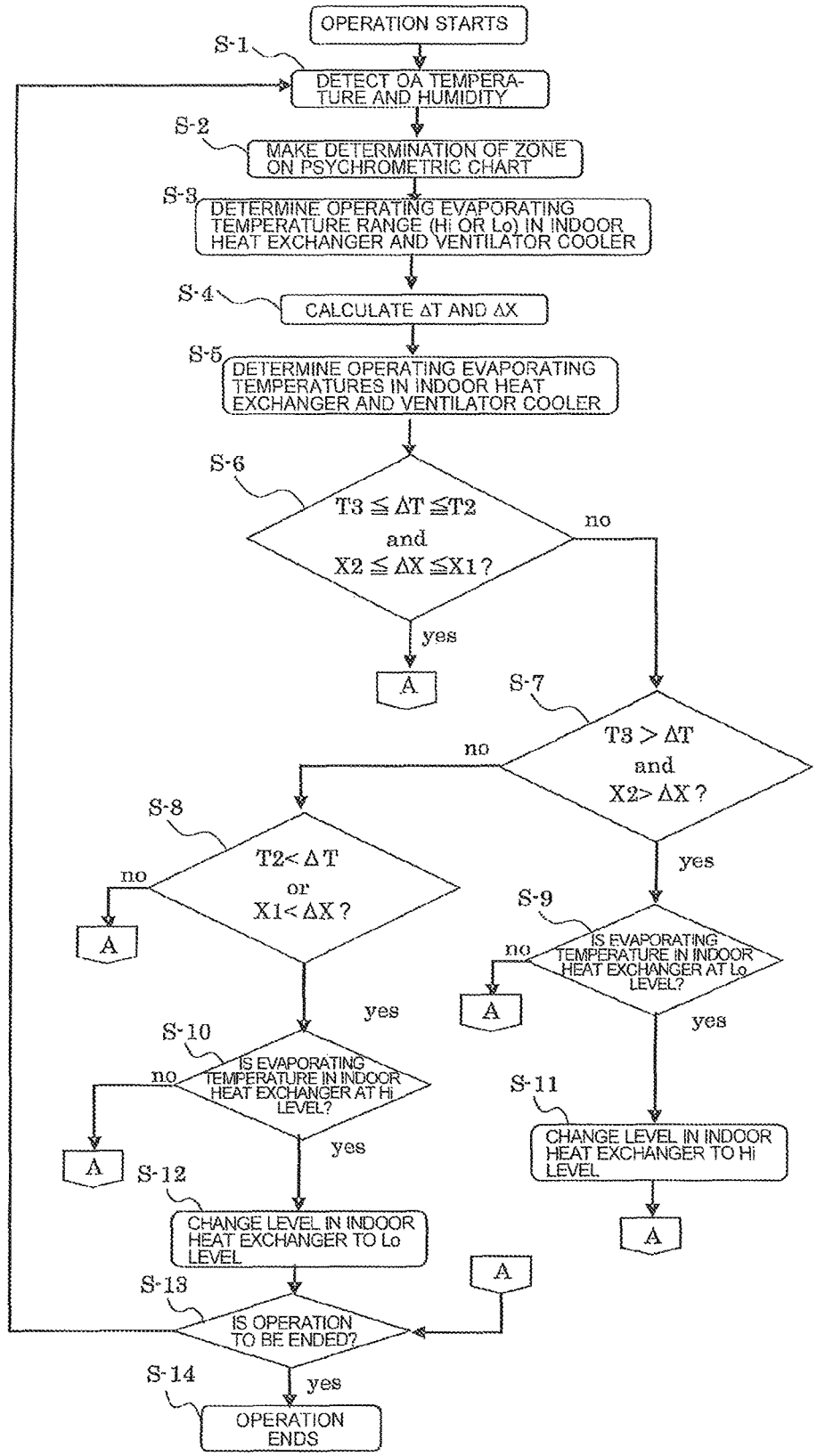
FIG. 13 is a control flow diagram in the present invention.

FIG. 13 is an evaporating temperature control flow diagram in which the difference ΔT obtained by subtracting the room air target temperature Ta_tgt from the room air temperature Ta and the difference ΔX obtained by subtracting the room air target absolute humidity Xa_tgt from the room air absolute humidity Xa serve as control parameters.

After operation starts, the temperature and humidity of outdoor air are detected with the OA temperature-humidity detection unit 31 in S-1.

A determination on the zone I to the zone IV in FIG. 7 is made in accordance with the detected outdoor air temperature and humidity in S-2.

The evaporating temperature level (Hi level or Lo level) in the indoor heat exchanger 15 of the indoor unit 1 system and the ventilator cooler 18 of the ventilator 3 system is determined with reference to FIG. 6 in S-3.

In S-4, the difference ΔT obtained by subtracting the room air target temperature Ta_tgt from the room air temperature Ta is calculated, and the difference ΔX obtained by subtracting the room air target absolute humidity Xa_tgt from the room air absolute humidity Xa is calculated.

Evaporating temperature setting values Te are determined with reference to FIG. 5 in S-5.

In S-6, it is determined whether or not the difference ΔT obtained by subtracting the room air target temperature Ta_tgt from the room air temperature Ta is not less than T3 and not more than T2 in FIG. 11, and whether or not the difference ΔX obtained by subtracting the room air target absolute humidity Xa_tgt from the room air absolute humidity Xa is not less than X2 and not more than X1 in FIG. 12, and, if the conditions are not satisfied, the flow proceeds to S-7. If the conditions are satisfied in S-6, it is determined whether or not the operation is to be ended in S-13. The flow returns to S-1 and a similar process is repeated if the operation is not to be ended, and the operation ends in S-14 if the operation is to be ended.

In S-7, it is determined whether or not ΔT is smaller than T3, and whether or not ΔX is smaller than X2, and, if the conditions are not satisfied, the flow proceeds to S-8, and, if the conditions are satisfied, the flow proceeds to S-9. If the flow proceeds to S-8, it is determined whether or not ΔT is larger than T2, or whether or not ΔX is larger than X1, and, if the condition is not satisfied, the flow proceeds to S-13, and a determination as to whether or not the operation is to be ended is made as described above. If the condition is satisfied in S-8, the flow proceeds to S-10, and it is determined whether or not an evaporating temperature in the indoor heat exchanger 15 is at the Hi level, and, if the condition is satisfied, it is determined that the temperature or humidity has not reached the room air target temperature or humidity and the evaporating temperature is at the Hi level, the flow proceeds to S-12, and the evaporating temperature level in the indoor heat exchanger 15 is changed to the Lo level. If the condition is not satisfied in S-10, or after the flow proceeds to S-12, the flow proceeds to S-13, and a determination as to whether or not the operation is to be ended is made as described above.

On the other hand, if the flow proceeds from S-7 to S-9, it is determined whether or not the evaporating temperature in the indoor heat exchanger 15 is at the Lo level, and, if the condition is satisfied, the flow proceeds to S-11, and the evaporating temperature level in the indoor heat exchanger 15 is changed to the Hi level. If the condition is not satisfied in S-9, the flow proceeds to S-13, and a determination as to whether or not the operation is to be ended is made as described above.

In such control, a sensible heat load and a latent heat load are assumed from outdoor air temperature and humidity, optimum evaporating temperatures in the indoor heat exchanger 15 and the ventilator cooler 18 are determined with feedforward, then the optimum evaporating temperature in the indoor heat exchanger 15 is modified with feedback control using room air temperature and humidity, and thus a time period taken to find an optimum value of an evaporating temperature is shortened, and changes in load can be followed, thereby enhancing energy-saving effects.

Embodiment 2

Figure 14:
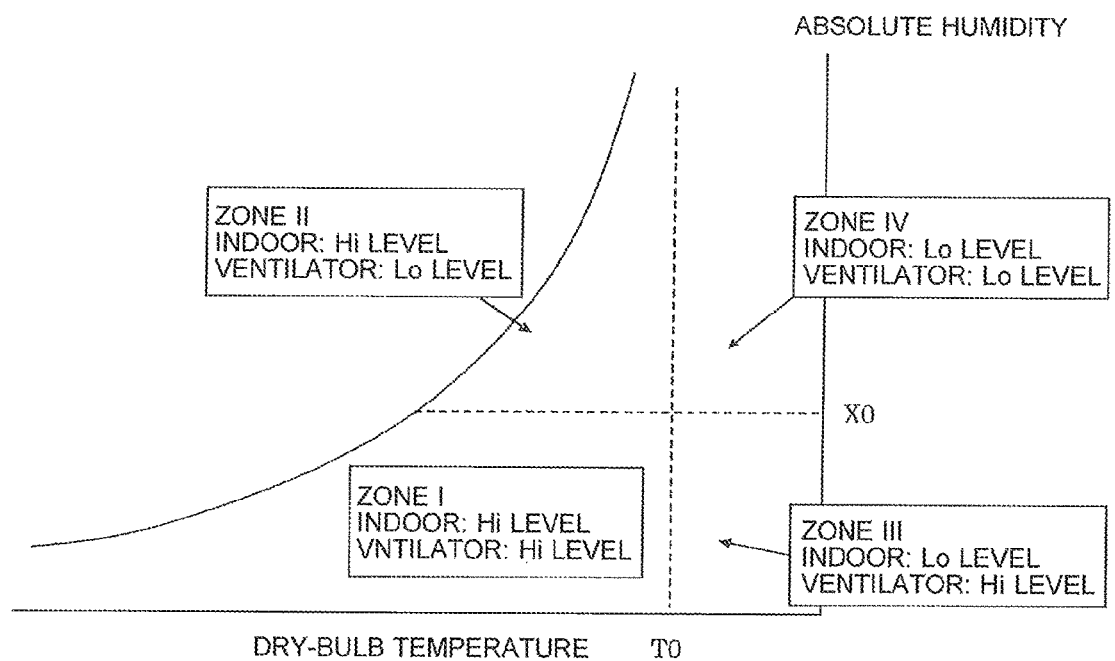
FIG. 14 is a psychrometric chart illustrating evaporating temperature levels in Embodiment 2 of the present invention.

In Embodiment 1, as illustrated in FIGS. 7 and 8, on each psychrometric chart, outdoor air conditions are assigned to four zones with respect to the dry-bulb temperature T0 and the absolute humidity X0 serving as boundaries, and the evaporating temperature levels in the indoor heat exchanger 15 and the ventilator cooler 18 in the same zone are the same Hi level or Lo level; however, in Embodiment 2, as illustrated in FIG. 14, the evaporating temperature levels in the indoor heat exchanger 15 and the ventilator cooler 18 are individually set. The other components and evaporating temperature control are the same as those in Embodiment 1.

That is to say, in low sensible heat and low latent heat load conditions (zone I), even if the evaporating temperature in the indoor heat exchanger 15 which mainly handles sensible heat is increased, insufficient cooling does not occur because of a low sensible heat load, and, even if the evaporating temperature in the ventilator cooler 18 which performs latent heat processing is increased, insufficient dehumidification does not occur because of a low latent heat load.

Thus, the evaporating temperature level in FIG. 6 can be set to the Hi level for both of the indoor heat exchanger 15 and the ventilator cooler 18.

In low sensible heat and high latent heat load conditions (zone II), even if the evaporating temperature in the indoor heat exchanger 15 which mainly handles sensible heat is increased, insufficient cooling does not occur because of a low sensible heat load; however, if the evaporating temperature in the ventilator cooler 18 which performs latent heat processing is increased, insufficient dehumidification occurs because of a high latent heat load. That is to say, the evaporating temperature level in FIG. 6 has to be set to the Hi level for the indoor heat exchanger 15 and the Lo level for the ventilator cooler 18.

In high sensible heat load and low latent heat load conditions (zone III), even if the evaporating temperature in the ventilator cooler 18 which handles a latent heat load is increased, insufficient dehumidification does not occur because of a low latent heat load; however, if the evaporating temperature in the indoor heat exchanger 15 which mainly handles sensible heat is increased, insufficient cooling occurs because of a high sensible heat load. That is to say, the evaporating temperature level in FIG. 6 has to be set to the Lo level for the indoor heat exchanger 15 and can be set to the Hi level for the ventilator cooler 18.

In high sensible heat and high latent heat load conditions (zone IV), if the evaporating temperature in the indoor heat exchanger 15 is increased, insufficient cooling occurs because of a high sensible heat load, and, if the evaporating temperature in the ventilator cooler 18 which performs latent heat load processing is increased, insufficient dehumidification occurs because of a high latent heat load. That is to say, the evaporating temperature level in FIG. 6 has to be set to the Lo level for both of the indoor heat exchanger 15 and the ventilator cooler 18.

In this way, in each of the zones I to IV, the evaporating temperature levels in the indoor heat exchanger 15 and the ventilator cooler 18 are individually set to the Hi level or the Lo level, thereby enabling a sensible heat load and a latent heat load to be handled more appropriately.

In Embodiments 1 and 2, ET_max and ET_min are determined for the evaporating temperature levels of the Hi level and the Lo level; however, fixed values may be set such that, for example, an evaporating temperature for the Hi level is fixed at ET=14 degrees C. and an evaporating temperature for the Lo level is fixed at ET=0 degrees C.

Figure 15:
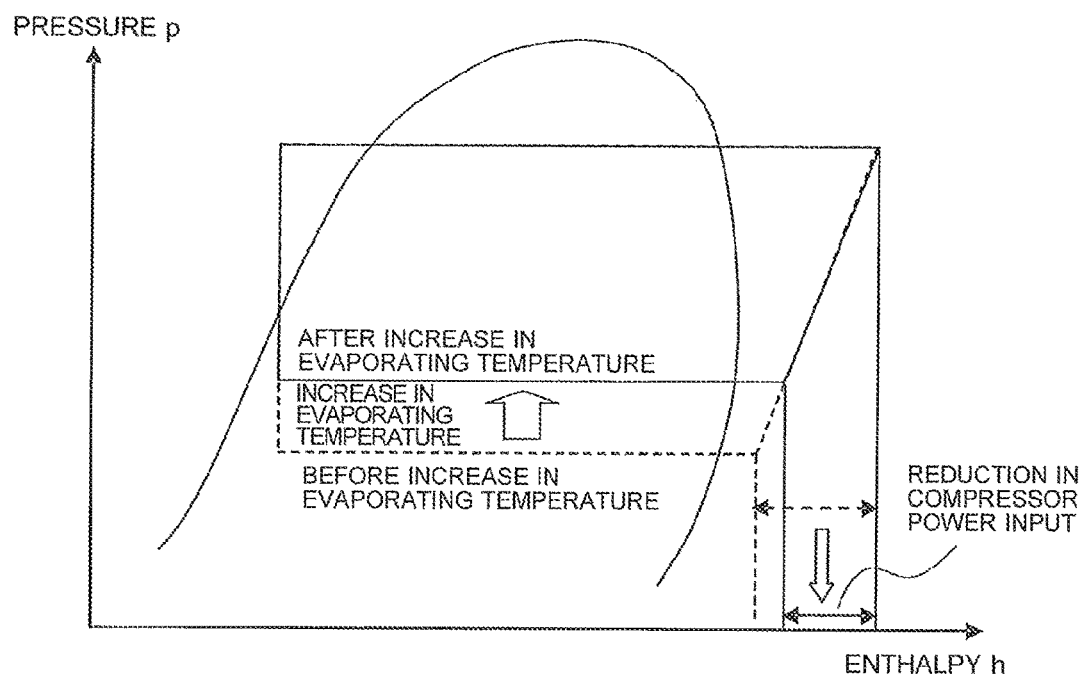
FIG. 15 illustrates energy-saving effects due to an increase in evaporating temperature setting value in the present invention.

Control in Embodiments 1 and 2 enables an optimal evaporating temperature to be set in accordance with a load. That is to say, the evaporating temperature setting value Te can be set to a high value while a sensible heat load and a latent heat load are handled with certainty, and compressor power input is reduced as illustrated in FIG. 15, thereby resulting in energy savings. Excessive sensible heat load or latent heat load processing can also be reduced, thereby reducing loads and enhancing energy-saving effects.

Furthermore, in Embodiments 1 and 2, since a load is determined on the basis of detection of outdoor air temperature and humidity, if it is determined that the load is a low load, operation can also be performed at a high evaporating temperature at its start, and energy-saving effects in a cool down period (pull down period) at the start are also achieved. The evaporating temperature level is separated into two of the Hi level and the Lo level as illustrated in FIG. 6, but may be separated into three or more.

Furthermore, in the case where the indoor unit 1 is thermostatically turned off even if the maximum evaporating temperature ET_max of the evaporating temperature level of the Hi level is set, a target SH (degree of superheat) in an evaporator is increased so as to reduce capacity, and thus start-stop loss may be avoided.

REFERENCE SIGNS LIST 1 indoor unit 2 outdoor unit 3 ventilator 11 compressor 12 four-way valve 13 outdoor heat exchanger 14a first expansion valve 14b second expansion valve 15 indoor heat exchanger 16 outdoor heat exchanger fan 17 indoor heat exchanger fan 18 ventilator cooler 19 air supply fan 20 air exhaust fan 30 total heat exchanger 31 OA temperature-humidity detection unit 32 RA temperature-humidity detection unit 41 compressor frequency adjustment unit 42 evaporating temperature detection unit 43 intake temperature-humidity detection unit 44 target temperature-humidity setting unit 100 air-conditioning system 102 central controller 103 transmission line 104 refrigerant pipe

The invention claimed is:

1. An air-conditioning system comprising:
a refrigerant system including an outdoor unit, an indoor unit, and a ventilator through which refrigerant circulates and implementing a single refrigeration cycle;
a controller connected to the outdoor unit, the indoor unit and the ventilator with a transmission line, and
a unit configured to detect temperature and humidity of outdoor air,
wherein the refrigerant system includes a compressor, an outdoor heat exchanger, a first expansion valve, an indoor heat exchanger, a second expansion valve, and a ventilator cooler,
wherein the indoor unit includes the indoor heat exchanger, and is configured to circulate room air while adjusting a temperature of the room air,
wherein the ventilator includes the ventilator cooler, and is configured to replace room air with outdoor air, and also to cool and dehumidify outdoor air introduced to a room with the ventilator cooler,
wherein the outdoor unit, the indoor unit, and the ventilator are connected with a refrigerant pipe to form a single refrigerant circuit,
wherein the controller is configured to:
individually determine maximum evaporating temperature setting values and minimum evaporating temperature setting values in both of the indoor heat exchanger and the ventilator cooler in accordance with outdoor air temperature and humidity, and
control evaporating temperatures in the indoor heat exchanger and the ventilator cooler so as to be not more than the maximum evaporating temperature setting values and not less than the minimum evaporating temperature setting values.

2. The air-conditioning system of claim 1,
wherein evaporating temperatures in the indoor heat exchanger and the ventilator cooler are controlled based on a temperature difference $\Delta T$ obtained by subtracting a set room air target temperature from a detected room air temperature.

3. The air-conditioning system of claim 1,
wherein the maximum evaporating temperature setting values and the minimum evaporating temperature setting values each include two types of setting values of a Hi level evaporating temperature at which an evaporating temperature is high and a Lo level evaporating temperature at which an evaporating temperature is low, and the Hi level evaporating temperature and the Lo level evaporating temperature are changed based on the outdoor air temperature and humidity.

4. The air-conditioning system of claim 3,
wherein, while setting to the Hi level evaporating temperature is being implemented, when the temperature difference $\Delta T$ exceeds a first specified value which is a positive value, or when an absolute humidity difference $\Delta X$ between detected room air absolute humidity and set room air target absolute humidity exceeds a second specified value which is a positive value, the maximum evaporating temperature setting values and the minimum evaporating temperature setting values in the indoor heat exchanger are changed to the Lo level evaporating temperature.

5. The air-conditioning system of claim 3,
wherein, while setting to the Lo level evaporating temperature is being implemented, when the temperature difference $\Delta T$ is less than a third specified value which is a negative value, and when an absolute humidity difference $\Delta X$ between detected room air absolute humidity and set room air target absolute humidity is less than a fourth specified value which is a negative value, the maximum evaporating temperature setting values and the minimum evaporating temperature setting values in the indoor heat exchanger are changed to the Hi level evaporating temperature.

6. The air-conditioning system of claim 1,
wherein the maximum evaporating temperature setting values and the minimum evaporating temperature setting values are setting values different between the indoor heat exchanger and the ventilator cooler.

7. The air-conditioning system of claim 1,
wherein the outdoor air temperature and humidity are divided into four zones with respect to a certain value T0 of a dry-bulb temperature and a certain value X0 of absolute humidity serving as threshold values on a psychrometric chart.

8. The air-conditioning system of claim 7,
wherein, among the four zones, in a zone in which at least the outdoor air temperature and humidity are not more than the value T0 of the dry-bulb temperature and not more than the value X0 of the absolute humidity, the maximum evaporating temperature setting values and the minimum evaporating temperature setting values are each set to a Hi level evaporating temperature at which an evaporating temperature is high.

9. The air-conditioning system of claim 7,
wherein, among the four zones, in a zone in which at least the outdoor air temperature and humidity are not less than the value T0 of the dry-bulb temperature and not less than the value X0 of the absolute humidity, the maximum evaporating temperature setting values and the minimum evaporating temperature setting values are each set to a Lo level evaporating temperature at which an evaporating temperature is low.

10. The air-conditioning system of claim 7,
wherein the value T0 of the dry-bulb temperature and the value X0 of the absolute humidity are changed based on a set room air target temperature.

11. The air-conditioning system of claim 7,
wherein the value T0 of the dry-bulb temperature and the value X0 of the absolute humidity are changed based on air volume of the ventilator.

12. The air-conditioning system of claim 1,
wherein the indoor heat exchanger and the ventilator cooler are connected in parallel with respect to the compressor in the single refrigerant circuit implementing the single refrigeration cycle.

* * * * *